United States Patent
Morisaki (10) Patent No.: US 8,467,096 B2
(45) Date of Patent: Jun. 18, 2013

(54) PRINTER AND COMPUTER-READABLE STORAGE MEDIUM FOR CONTROLLING THE SAME

(75) Inventor: Hiroshi Morisaki, Aichi (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 341 days.

(21) Appl. No.: 12/891,455

(22) Filed: Sep. 27, 2010

(65) Prior Publication Data

US 2011/0102819 A1   May 5, 2011

(30) Foreign Application Priority Data

Oct. 29, 2009   (JP) .................................. 2009-249123

(51) Int. Cl.
*G06F 15/00* (2006.01)

(52) U.S. Cl.
USPC .............. 358/1.9; 358/3.24; 358/3.26; 347/7; 347/14

(58) Field of Classification Search
None
See application file for complete search history.

(56) References Cited

U.S. PATENT DOCUMENTS

| | | | | |
|---|---|---|---|---|
| 5,663,750 | A * | 9/1997 | Sakuma ............................. | 347/7 |
| 7,280,774 | B2 * | 10/2007 | Kang ............................... | 399/27 |
| 7,646,509 | B1 * | 1/2010 | Nagarajan et al. ............. | 358/1.9 |
| 2002/0071131 | A1 * | 6/2002 | Nishida ........................... | 358/1.9 |
| 2005/0024669 | A1 * | 2/2005 | Aoki .............................. | 358/1.13 |
| 2005/0057592 | A1 * | 3/2005 | Nimura ........................... | 347/14 |
| 2005/0068592 | A1 * | 3/2005 | Kim et al. ...................... | 358/498 |
| 2007/0030504 | A1 * | 2/2007 | Kawamoto et al. ............ | 358/1.9 |
| 2007/0229877 | A1 * | 10/2007 | Shima ........................... | 358/1.14 |
| 2008/0002241 | A1 * | 1/2008 | Shiono .......................... | 358/474 |
| 2008/0260396 | A1 * | 10/2008 | Yamada ......................... | 399/27 |
| 2009/0034026 | A1 * | 2/2009 | Nomura et al. ................ | 358/494 |
| 2009/0161979 | A1 * | 6/2009 | Kim .............................. | 382/261 |

FOREIGN PATENT DOCUMENTS

| | | |
|---|---|---|
| JP | 5-158293 A | 6/1993 |
| JP | 5-309871 A | 11/1993 |
| JP | 2007-43569 A | 2/2007 |

* cited by examiner

*Primary Examiner* — Twyler Haskins
*Assistant Examiner* — Helen Q Zong
(74) *Attorney, Agent, or Firm* — Scully, Scott, Murphy & Presser, P.C.

(57) ABSTRACT

A printer is provided that includes a printing unit, a detector that outputs a detection signal corresponding to one of a remaining amount of coloring agent and a consumed amount of coloring agent, and a controller configured to perform a switching process. In the switching process, when determining, based on the detection signal, that a usable amount of coloring agent is more than a first reference value, the controller controls the printing unit to perform a normal printing operation to print an original image based on image data. Meanwhile, in the switching process, when determining, based on the detection signal, that the usable amount of coloring agent is equal to or less than the first reference value, the controller controls the printing unit to perform a show-through cancellation printing operation to print an image that is formed by removing an image recognized as a show-through image from the original image.

16 Claims, 6 Drawing Sheets

PRINTER AND COMPUTER-READABLE STORAGE MEDIUM FOR CONTROLLING THE SAME

CROSS-REFERENCE TO RELATED APPLICATION

This application claims priority under 35 U.S.C. §119 from Japanese Patent Application No. 2009-249123 filed on Oct. 29, 2009. The entire subject matter of the application is incorporated herein by reference.

BACKGROUND

1. Technical Field

The following description relates to one or more technologies for controlling a printer.

2. Related Art

A printer has been known that is configured to, when a remaining amount of coloring agent (e.g., toner and ink) becomes equal to or less than a predetermined value, print an image based on image data on a sheet with a density lower than that of an original image based on the image data. According to the known printer, it is possible to maintain a printable state of the printer as long as possible even after the remaining amount of the coloring agent becomes equal to or less than the predetermined value, by lowering the density to save a consumed amount of the coloring agent.

SUMMARY

However, the known printer has a problem that a portion, of the original image, which a user wishes to print in a definite manner might also be printed with an inadequate density after the remaining amount of the coloring agent becomes equal to or less than the predetermined value. Thus, the original image might be printed with a lower reproducibility.

Aspects of the present invention are advantageous to provide one or more improved techniques for a printer that make it possible to prevent an intended image from being printed with a lower reproducibility, while saving a consumed amount of coloring agent.

According to aspects of the present invention, a printer is provided that includes a printing unit configured to print, on a sheet, an image based on image data with coloring agent, a detector configured to output a detection signal corresponding to one of a remaining amount of coloring agent and a consumed amount of coloring agent, a determining unit configured to determine, based on the detection signal from the detector, whether a usable amount of coloring agent is equal to or less than a first reference value, and a controller configured to perform a switching process. In the switching process, when the determining unit determines that the usable amount of coloring agent is more than the first reference value, the controller controls the printing unit to perform a normal printing operation to print an original image based on the image data. In the switching process, when the determining unit determines that the usable amount of coloring agent is equal to or less than the first reference value, the controller controls the printing unit to perform a show-through cancellation printing operation to print an image that is formed by removing an image recognized as a show-through image from the original image.

According to aspects of the present invention, further provided is a printer that includes a reading unit configured to generate image data by performing one of single-side reading to read a single side of a document sheet and double-side reading to read both sides of a document sheet, a printing unit configured to print, on a sheet, an image based on the image data generated by the reading unit with coloring agent, a detector configured to output a detection signal corresponding to one of a remaining amount of coloring agent and a consumed amount of coloring agent, an accepting unit configured to accept an input to select one of a show-through cancellation mode, a switching mode, and a prohibition mode, and a controller configured to control the printing unit to perform one of a normal printing operation, a show-through cancellation printing operation, and a low-density printing operation. When the image data is generated in the double-side reading and the accepting unit accepts an input to select the switching mode, the controller performs a switching process. In the switching process, when determining that a usable amount of coloring agent is more than a first reference value based on the detection signal from the detector, the controller controls the printing unit to perform the normal printing operation to print an original image based on the image data. Meanwhile, in the switching process, when determining that the usable amount of coloring agent is equal to or less than the first reference value based on the detection signal from the detector, the controller controls the printing unit to perform the show-through cancellation printing operation to print an image that is formed by removing an image recognized as a show-through image from the original image. When the image data is generated in the double-side reading and the accepting unit accepts an input to select the show-through cancellation mode, the controller controls the printing unit to perform the show-through cancellation printing operation regardless of whether the usable amount of coloring agent is equal to or less than the first reference value. When the image data is generated in the single-side reading or the accepting unit accepts an input to select the prohibition mode, the controller controls the printing unit to perform the normal printing operation regardless of whether the usable amount of coloring agent is equal to or less than the first reference value. When determining, based on the detection signal from the detector, that the usable amount of coloring agent is equal to or less than a second reference value that is lower than the first reference value, the controller controls the printing unit to perform the low-density printing operation to print an image with a density lower than an original density of the original image based on the image data, regardless of whether the image data is generated in the single-side reading or the double-side reading or which mode is selected.

According to aspects of the present invention, further provided is a computer-readable storage medium storing computer-readable instructions for controlling a printer that includes a printing unit configured to print, on a sheet, an image based on image data with coloring agent, and a detector configured to output a detection signal corresponding to one of a remaining amount of coloring agent and a consumed amount of coloring agent. When executed by a processor, the instructions cause the printer to perform the steps of determining, based on the detection signal from the detector, whether a usable amount of coloring agent is equal to or less than a first reference value, and performing a switching process. The switching process includes a step of, when it is determined, in the step of determining, that the usable amount of coloring agent is more than the first reference value, controlling the printing unit to perform a normal printing operation to print an original image based on the image data, and a step of, when it is determined, in the step of determining, that the usable amount of coloring agent is equal to or less than the first reference value, controlling the printing unit to perform a show-through cancellation printing operation to print an image that is formed by removing an image recognized as a show-through image from the original image.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, flash memories, EEPROMs, CD-media, DVD-media, temporary storage, hard disk drives, floppy drives, permanent storage, and the like.

Hereinafter, an embodiment according to aspects of the present invention will be described with reference to the accompany drawings.

1. Electrical Configuration of MFP

Figure 1:
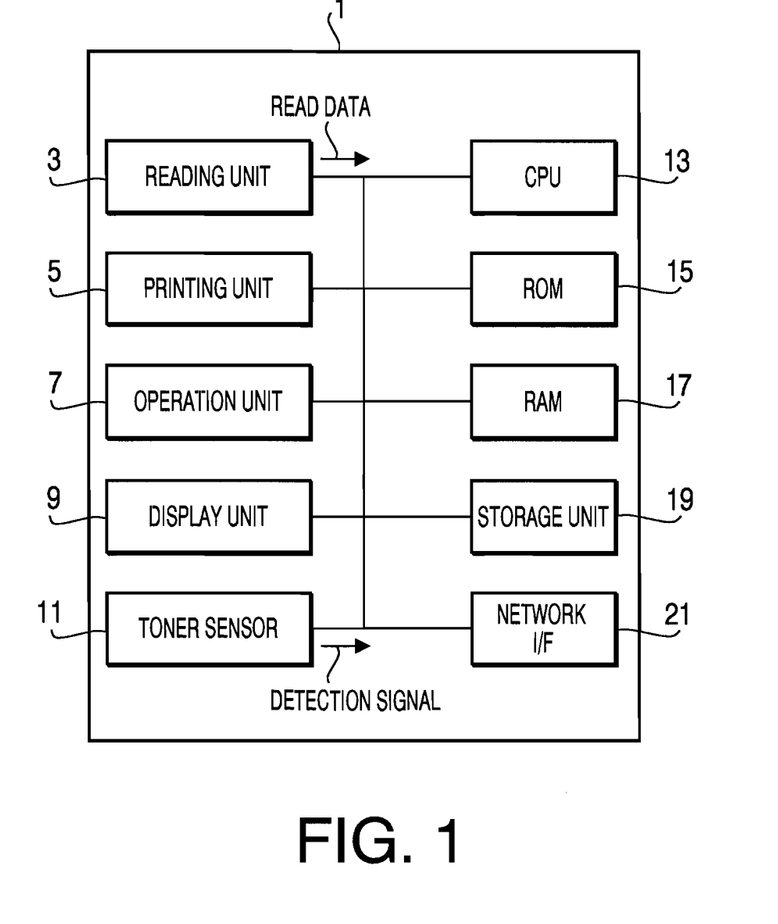
FIG. 1 is a block diagram schematically showing an electrical configuration of a multi-function peripheral (MFP) in an embodiment according to one or more aspects of the present invention.

As shown in FIG. 1, a multi-function peripheral (MFP) 1, which has multiple functions such as a copy function, a scanning function, and a facsimile function, includes a reading unit 3, a printing unit 5, an operation unit 7, a display unit 9, a toner sensor 11, a CPU 13, a ROM 15, a RAM 17, a storage unit 19 (e.g., non-volatile memory such as an NVRAM, a flash ROM, an HDD), and a network interface 21.

The reading unit 3 is configured to read one or more images from a document sheet and generate image data (hereinafter referred to as "read data") based on the read images. Further, the reading unit 3 is configured to perform single-side reading to read a single side of a document sheet and double-side reading to read both sides of a document sheet.

The printing unit 5 is configured to print, on a sheet X, images (monochrome images or color images) based on image data such as the read images, e.g., in an electrophotographic method. The operation unit 7 is provided with a plurality of buttons and configured to accept therethrough various inputs from a user. The display unit 9 is provided with a liquid crystal display and lamps, and configured to display various setting screens and operational statuses of the MFP 1.

The toner sensor 11 is an optical sensor configured to output a detection signal corresponding to an amount of toner remaining in a toner container (not shown) of the printing unit 5 (hereinafter referred to as a "remaining amount of toner"). The ROM 15 stores thereon a below-mentioned copy control program for performing a copy process, and programs for performing various operations of the MFP 1. The CPU 13 controls each element of the MFP 1 in accordance with a program read out of the ROM 15 while storing processing results of a currently-executed operation onto an internal memory (e.g., the RAM 17 or the storage unit 19).

The network interface 21 is configured to be connected with an external device (e.g., a personal computer or an MFP not shown) via a network cable (not shown), so as to attain mutual data communication between the MFP 1 and the external device.

2. Copy Process

Figure 2:
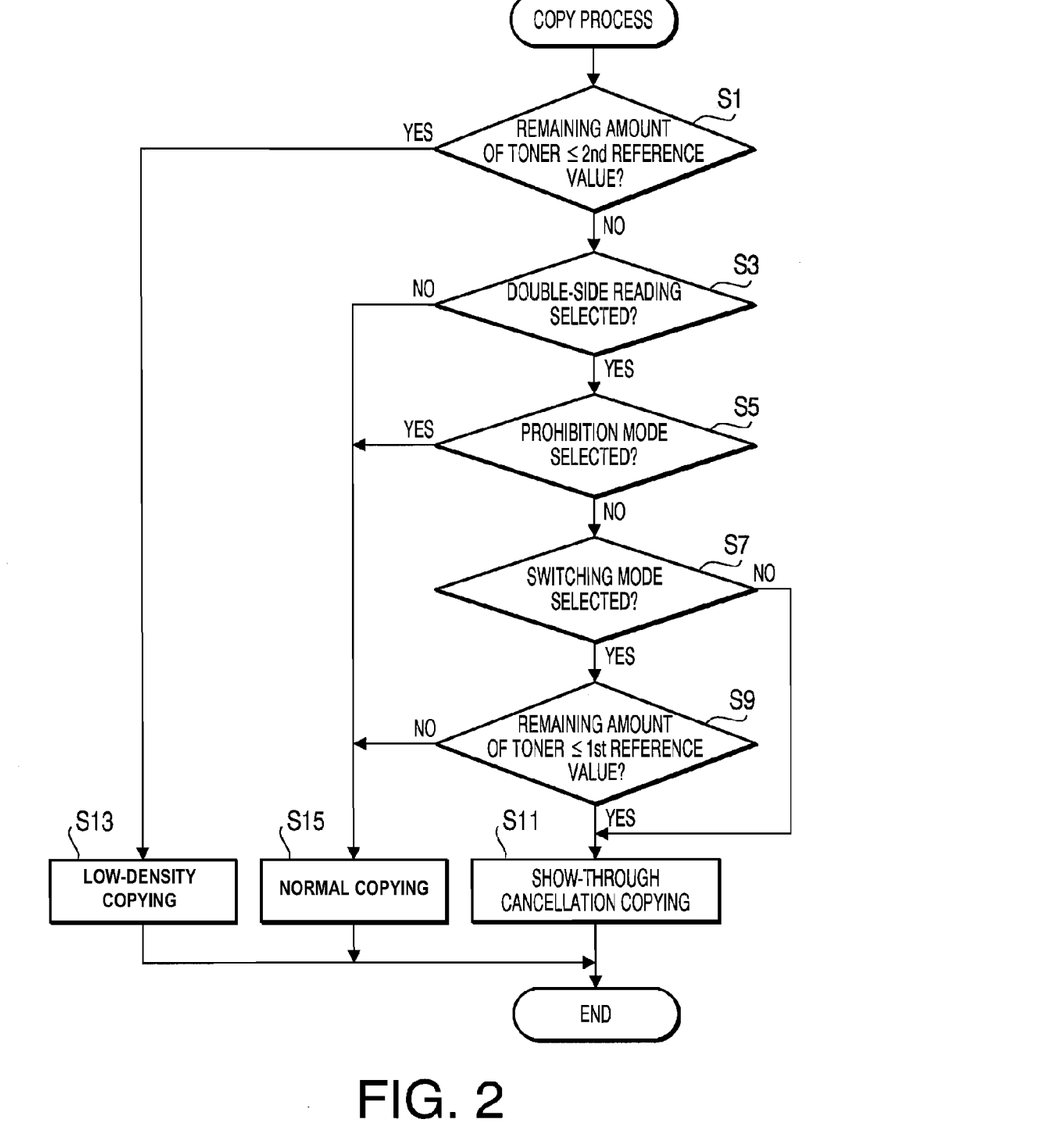
FIG. 2 is a flowchart showing a procedure of a copy process to be executed by (a CPU of) the MFP in the embodiment according to one or more aspects of the present invention.
Figure 3:
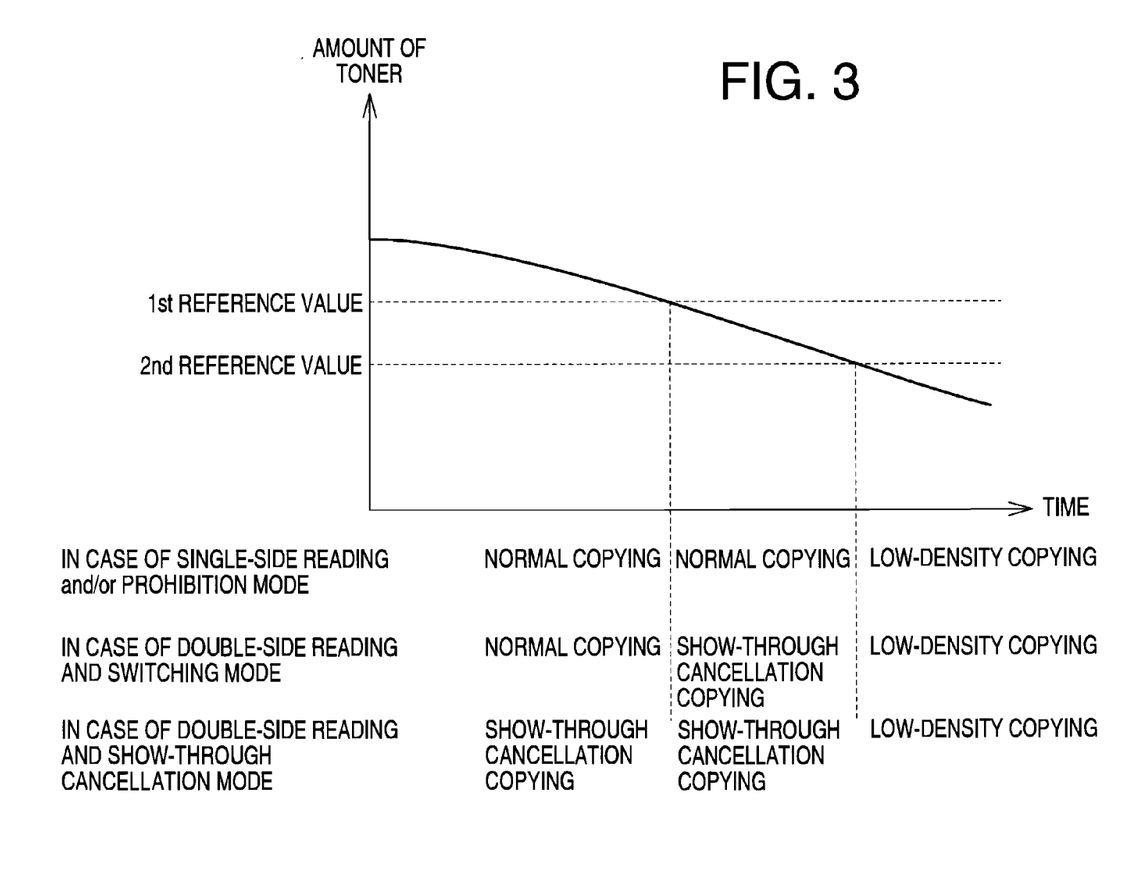
FIG. 3 is a graph showing a remaining amount of toner that changes with time in the embodiment according to one or more aspects of the present invention.
Figure 4A:
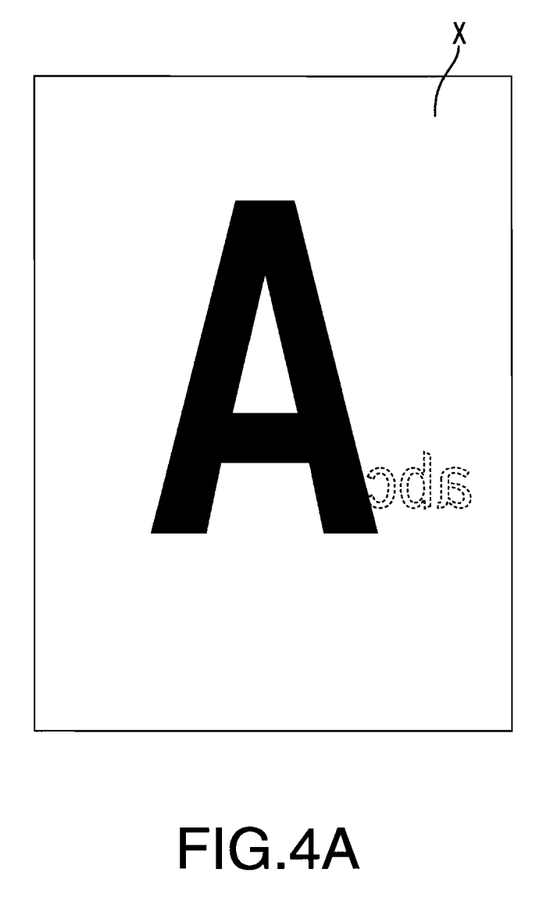
FIG. 4A shows a sheet printed when the MFP performs a normal copying operation to read a single side of a document sheet in the embodiment according to one or more aspects of the present invention.
Figure 4B:
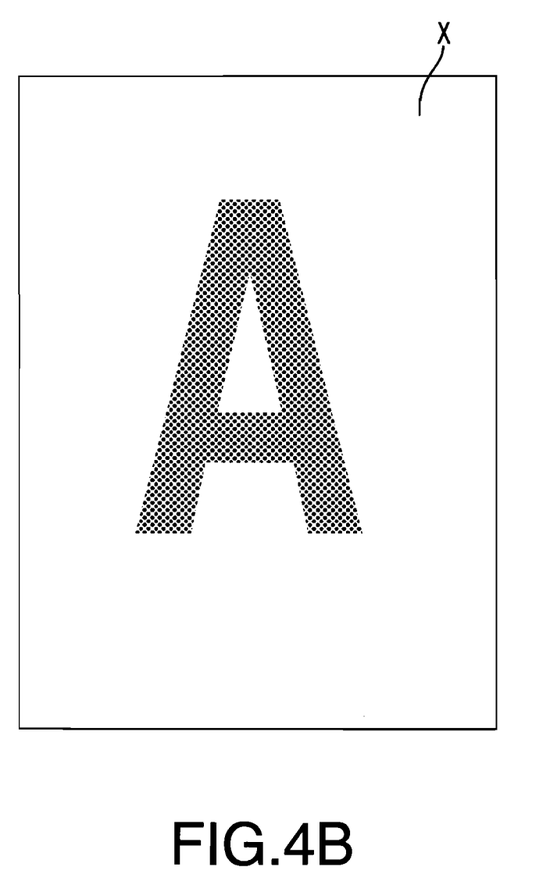
FIG. 4B shows a sheet printed when the MFP performs a low-density copying operation to read the single side of the document sheet in the embodiment according to one or more aspects of the present invention.
Figure 4C:
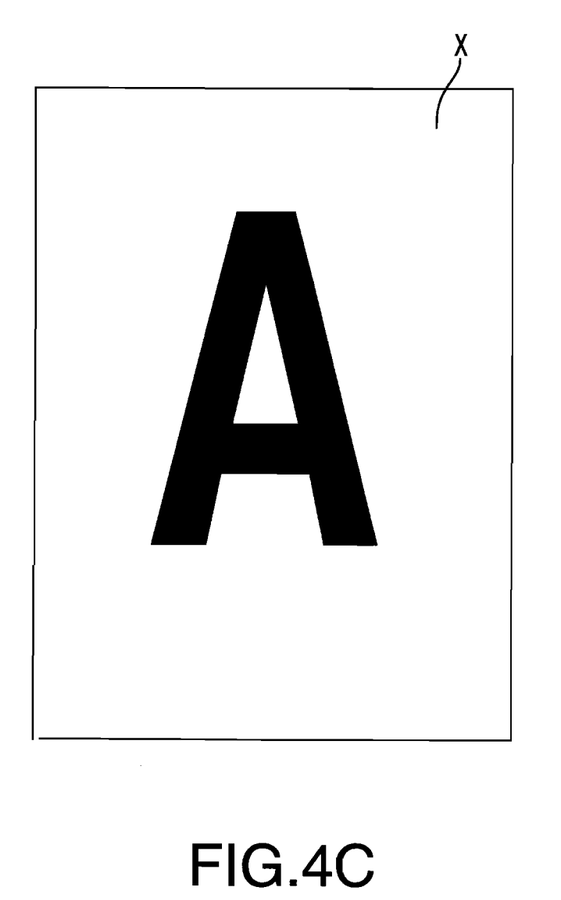
FIG. 4C shows a sheet printed when the MFP performs a show-through cancellation copying operation to read the single side of the document sheet in the embodiment according to one or more aspects of the present invention.

FIG. 2 is a flowchart showing a procedure of a copy process. FIG. 3 is a graph showing the remaining amount of toner changing with lapse of time. The following description will provide an example to copy each side of a document sheet that has an image "A" on a first side thereof and an image "abc" on a second side thereof. FIG. 4A shows the sheet X output when the MFP 1 performs a below-mentioned normal copying operation to copy the first side of the document sheet. FIG. 4B shows the sheet X output when the MFP 1 performs a below-mentioned low-density copying operation to copy the first side of the document sheet. FIG. 4C shows the sheet X output when the MFP 1 performs a below-mentioned show-through cancellation copying operation to copy the first side of the document sheet.

For example, when the user issues an instruction to implement the copy function through the operation unit 7, the CPU 13 reads out the copy control program from the internal memory and performs the copy process. It is noted that when issuing the instruction to implement the copy function, the user selects one of the "single-side reading" and the "double-side reading" through the operation unit 7. Further, at this time, the user selects one of a "prohibition mode," a "switching mode," and a "show-through cancellation mode." Thereby, the operation unit 7 accepts the user selections, and transmits information on the user selections to the CPU 13. It is noted that when the user issues the instruction to implement the copy function without selecting any reading method (the "single-side reading" or the "double-side reading"), the reading unit 3 performs the "single-side reading." Further, when the user issues the instruction to implement the copy function without selecting any mode (the "prohibition mode," the "switching mode," or the "show-through cancellation mode"), the reading unit 3 performs the "switching mode."

The CPU 13 determines a currently remaining amount of toner based on the detection signal from the toner sensor 11, and determines whether the remaining amount of toner is equal to or less than a second reference value (S1). For instance, preferably, the second reference value may be a remaining amount of toner that is consumed to such a level (a near-empty level) as to be unable to perform printing with original densities of the read images (or with a reading density designated by the user via the operation unit 7). When the MFP 1 has plural colors of toner, preferably, the aforementioned remaining amount of toner may be a remaining amount of toner of a color that is currently used in printing. Further, when two or more colors of toner are currently used, preferably, the aforementioned remaining amount of toner may be a remaining amount of at least one of the two or more colors of toner.

(1) When the Remaining Amount of Toner is Equal to or Less than the Second Reference Value When determining that the remaining amount of toner is equal to or less than a second reference value (S1: Yes), the CPU 13 performs the low-density copying operation regardless of which mode the user has selected (S13, see FIG. 3), and then terminates the copy process. Specifically, the CPU 13 controls the reading unit 3 to perform one of the single-side reading and the double-side reading in accordance with the information on the user selections, and stores the read data generated by the reading unit 3 onto the internal memory. Then, the CPU 13 converts the read data into printable data, and controls the printing unit 5 to perform a low-density printing operation on the sheet X on the basis of the printable data acquired through the conversion.

The low-density printing operation is an operation of printing, on the sheet X, at least part of the read images with a density lower than the original density thereof. As an example of methods to lower the density of the at least part of the read images, cited is a method to extract an edges, from the read images, which has a density (i.e., a light intensity of light received by the reading unit 3) equal to or higher than a predetermined value, and print a portion other than the extracted edge with a density lower than the original density of the portion. Especially, compared with a below-mentioned show-through cancellation printing operation, a method to lower the densities of the read images as a whole can save a consumed amount of toner in a more certain and efficient manner so as to continue to perform printing for a longer time. Thus, the method to lower the densities of the read images as a whole is effective, especially when the remaining amount of toner becomes equal to or less than the second reference value.

In the low-density copying operation, as illustrated in FIG. 4B, it is possible to prevent a show-through image "abc," which is an undesired reverse-side image showing through the document sheet, from being printed on the sheet X. However, the intended image "A" is as well printed on the sheet X with a low density, and thus, it might result in a lower reproducibility in printing the image "A" on the sheet X. Accordingly, it is preferred to avoid execution of the low-density copying operation as far as the remaining amount of toner is not equal to or less than the second reference value.

(2) In Single-Side Reading

When determining that the remaining amount of toner is equal to or less than the second reference value (S1: No), the CPU 13 determines whether the user has selected the double-side reading as the reading method with reference to the information on the user selections (S3). When determining that the user has selected the single-side reading (S3: No), the CPU 13 performs the normal copying operation (S15, see FIG. 3). After that, the CPU 13 terminates the copy process. In the single-side reading, the document sheet is likely to have an image printed only on a single side thereof, and a show-through problem is hardly caused. Thus, a below-mentioned show-through cancellation copying operation is unlikely to contribute to efficiently saving the consumed amount of toner. That is why in the case where the single-side reading is selected, the show-through cancellation copying operation is not executed.

In the normal copying operation, the CPU 13 controls the reading unit 3 to perform single-side reading and stores onto the internal memory the read data generated by the reading unit 3. Then, the CPU 13 converts the read data into printable data, and controls the printing unit 5 to perform a normal printing operation on the sheet X based on the printable data after the conversion. It is noted that the normal printing operation is an operation of printing the read images on the sheet X with the original densities of the read images (or with the reading density designated by the user via the operation unit 7).

In the normal copying operation, as illustrated in FIG. 4A, it is possible to clearly print the intended image "A" on the sheet X. However, the show-through image "abc" on the second side of the document sheet might also be printed on the sheet X. It is noted that the show-through image is more likely to be read and printed as the document sheet is thinner. This is because the image "abc" on the second side is more likely to show through the document sheet and be easily read by the reading unit 3 together with the intended image "A" as the document sheet is thinner.

(3) In Double-Side Reading (3-1) Prohibition Mode

When determining that the user has selected the double-side reading as the reading method (S3: Yes), the CPU 13 determines whether the user has selected the prohibition mode with reference to the information on the user selections (S5). When determining that the user has selected the prohibition mode (S5: Yes), the CPU 13 performs the normal copying operation regardless of whether the remaining amount of toner is equal to or less than a below-mentioned first reference value (S15, see FIG. 3). After that, the CPU 13 terminates the copy process. It is noted that when the show-through cancellation copying operation is performed, an image other than a show-through image might also be regarded as a show-through image and cancelled. Hence, when wishing to avoid such an undesired situation, the user may select the prohibition mode.

(3-2) Switch Mode

When determining that the user has selected the switching mode (S5: No, and S7: Yes), the CPU 13 performs a switching process. Specifically, the CPU 13 determines whether the remaining amount of toner is equal to or less than a first reference value (S9). The first reference value is more than the second reference value. When determining that the remaining amount of toner is equal to or more than the first reference value (S9: No), the CPU 13 determines that the printing unit 5 can continue to perform printing without having to reduce the consumed amount of toner, and performs the normal copying operation (S15, see FIG. 3). After that, the CPU 13 terminates the copy process.

When determining that the remaining amount of toner is equal to or less than the first reference value (S9: Yes), the CPU 13 performs the show-through cancellation copying operation (S11, see FIG. 3), and thereafter terminates the copy process. Specifically, the CPU 13 controls the reading unit 3 to perform double-side reading in accordance with the information on the user selections, and stores the read data created by the reading unit 3 onto the internal memory. Then, the CPU 13 converts the read data into printable data, and controls the printing unit 5 to perform a show-through cancellation printing operation on the sheet X based on the printable data after the conversion.

The show-through cancellation printing operation is an operation to extract an image recognized as a show-through image from at least part of the read images and print on the sheet X an image which is formed by removing the show-through image (more specifically, the image recognized as a show-through image). It is noted that a lot of known techniques are available to extract an image recognized as a show-through image. For instance, as an example of the known techniques, cited is a technique to recognize, as a show-through image, an image that has a density equal to or less than a predetermined threshold value and/or an area equal to or less than a predetermined threshold value.

According to the show-through cancellation copying operation, it is possible to reduce the consumed amount of toner by an amount of toner corresponding to the canceled show-through image and continue to perform printing for a longer time. Further, in the show-through cancellation copying operation, an image other than the show-through image is printed on the sheet X with an original density of the image (or with the reading density designated by the user through the operation unit 7). Therefore, compared with the low-density copying operation in which the image other than the show-through image might be printed with a lower density, the show-through cancellation copying operation can print the image other than the show-through image with a higher reproducibility. Specifically, as depicted in FIG. 4C, in the show-through cancellation copying operation, it is possible to definitely print the intended image "A" while preventing the show-through image "abc" from being printed.

(3-3) Show-Through Cancellation Mode

When determining that the user has selected the show-through cancellation mode (S5: No, and S7: No), the CPU 13 performs the show-through cancellation copying operation regardless of whether the remaining amount of toner is equal to or less than the first reference value (S11). Thereafter, the CPU 13 terminates the copy process. Thereby, it is possible to perform the show-through cancellation printing operation at user's request.

3. Effects

The MFP 1 is configured to save the consumed amount of toner by performing the show-through cancellation printing operation when the remaining amount of toner is equal to or less than the first reference value. Thereby, it is possible to print an image of the read images other than a show-through image (more specifically, an image recognized as a show-through image) with the original density of the image. Therefore, compared with a known printer that prints read images with a lower density when there is a small amount of toner remaining, it is possible to print an image read from a document sheet with a higher reproducibility.

In addition, the MFP 1 performs the low-density printing operation when the remaining amount of toner is equal to or less than the second reference value. Thereby, it is possible to efficiently save the consumed amount of toner and maintain a printable state of the MFP 1 for a longer time.

Further, in the single-side reading, a document sheet is likely to have an image printed only on a single side thereof. In such a situation, execution of the show-through cancellation copying operation might provide the disadvantage to wrongly delete an intended image other than a show-through image, more than the advantage to save the consumed amount of toner by actually canceling the show-through image. Meanwhile, in the double-side reading, it is highly likely that a document sheet has an image printed on each side thereof. Especially in such a situation, the show-through cancellation copying operation is expected to contribute to saving the consumed amount of toner. Therefore, the MFP 1 does not perform the switching process for the read data created in the single-side reading, but performs the show-through cancellation printing operation for the read data created in the double-side reading, in accordance with the switching process (see S3 in FIG. 2).

Hereinabove, the embodiment according to aspects of the present invention has been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only an exemplary embodiment of the present invention and but a few examples of their versatility are shown and described in the present disclosure. It is to be understood that the present invention is capable of use in various other combinations and environments and is capable of changes or modifications within the scope of the inventive concept as expressed herein. For example, the following modifications are possible.

In the aforementioned embodiment, aspects of the present invention are applied to the MFP 1 having the reading unit 3. However, aspects of the present invention may be applied to a printer that is not provided with any reading unit. In this case, the printer may receive read data from an external reading device (or an MFP) directly or indirectly via an information processing device (e.g., a personal computer), and may perform the aforementioned copy process (excluding operations for image reading) based on the read data.

In the aforementioned embodiment, aspects of the present invention are applied to the read data created by the reading unit 3 during execution of the copy function. However, for instance, aspects of the present invention may be applied to read data stored on the internal memory of the MFP 1 or an external memory. Furthermore, aspects of the present invention may be applied to data (hereinafter referred to as non-read data), other than read data, which is created by an application. Specifically, when the user issues an instruction to execute the printing function through the operation unit 7, the CPU 13 may perform the aforementioned copy process (excluding operations for image reading) based on the read data or the non-read data. It is noted that the non-read data does not originally contain any show-through image. Nonetheless, when the show-through cancellation printing operation is performed for the non-read data, by recognizing a relatively-unnecessary one of images contained in the non-read data as a show-through image and canceling the relatively-unnecessary image, it is possible to save the consumed amount of toner while clearly printing a relatively-necessary image.

In the aforementioned embodiment, aspects of the present invention are applied to the MFP 1 configured to perform printing in an electrophotographic method. However, aspects of the present invention may be applied to an inkjet printer.

In the aforementioned embodiment, the toner sensor 11 is configured to output a detection signal corresponding to the remaining amount of toner. However, the toner sensor 11 may include a comparator that compares the remaining amount of toner with the first and second reference values, and may output a signal corresponding to a comparison result.

In the aforementioned embodiment, the remaining amount of toner is defined as a usable amount of toner to be compared with the first and second reference values. However, for instance, a difference between a predetermined upper usable limit and an accumulated amount of toner consumed after a time may be defined as a usable amount of toner.

In the aforementioned embodiment, the information on the user selections is acquired through the operation unit 7. However, the information on the user selections may be received from an external device (e.g., a personal computer) through the network interface 21.

In the aforementioned embodiment, the CPU 31 determines whether to perform the switching process depending on whether the remaining amount of toner is equal to or less than the first reference value. However, for instance, the CPU 31 may determine whether to perform the switching process depending on whether the remaining amount of toner is equal to or less than the second reference value.

Further, in the copy process, S3 may be executed in advance of S1. Moreover, even in the case of the single-side reading, the CPU 13 may advance to S5 so as to render the switching process executable.

In the aforementioned embodiment, the CPU 13 determines in S3 whether the user has selected the double-side reading. However, for instance, the CPU 13 may determine in S3 whether the thickness of the document sheet is equal to or less than a predetermined value, or whether the reading density is equal to or more than a predetermined value, and may advance to S5 in response to the affirmative determination made in S5 (i.e., when it is determined that the thickness of the document sheet is equal to or less than a predetermined value or that the reading density is equal to or more than a predetermined value).

Further, the MFP 1 may be configured to, when performing the show-through cancellation printing operation in the switching process, carry out the following operations. The CPU 13 may estimate the amount of toner that may be used for printing an image recognized as a show-through image, based on the density and/or size of the image, and determine the amount of toner saved by canceling the image recognized as a show-through image, based on the estimated amount. Then, when the amount of the saved toner is more than a predetermined value, the CPU 13 may perform the show-through cancellation printing operation. Meanwhile, when the amount of the saved toner is equal to or less than a predetermined value, the CPU 13 may determine that it is not possible to efficiently save the consumed amount of toner by the show-through cancellation printing operation, and instead perform the low-density printing operation.

What is claimed is:

1. A printer comprising:
   a printing unit configured to print, on a sheet, an image based on image data with coloring agent;
   a detector configured to output a detection signal corresponding to one of a remaining amount of coloring agent and a consumed amount of coloring agent;
   a determining unit configured to determine, based on the detection signal from the detector, whether a usable amount of coloring agent is equal to or less than a first reference value and whether the usable amount of coloring agent is equal to or less than a second reference value lower than the first reference value; and
   a controller configured to perform a switching process,
   wherein in the switching process, when the determining unit determines that the usable amount of coloring agent is more than the first reference value, the controller controls the printing unit to perform a normal printing operation to print an original image based on the image data,
   wherein in the switching process, when the determining unit determines that the usable amount of coloring agent is more than the second reference value and equal to or less than the first reference value, the controller controls the printing unit to perform a show-through cancellation printing operation to print an image that is formed by removing an image recognized as a show-through image from the original image, and
   wherein in the switching process, when the determining unit determines that the usable amount of coloring agent is equal to or less than the second reference value, the controller controls the printing unit to perform a low-density printing operation.

2. The printer according to claim 1, further comprising an accepting unit configured to accept an input to select one of a plurality of modes including a show-through cancellation mode and a switching mode,
   wherein when the accepting unit accepts an input to select the show-through cancellation mode, the controller controls the printing unit to perform the show-through cancellation printing operation regardless of determination by the determining unit as to whether the usable amount of coloring agent is equal to or less than the first reference value, and
   wherein when the accepting unit accepts an input to select the switching mode, the controller performs the switching process.

3. The printer according to claim 2, wherein the plurality of modes further include a prohibition mode to prohibit the show-through cancellation printing operation, and
   wherein when the accepting unit accepts an input to select the prohibition mode, the controller controls the printing unit to perform the normal printing operation regardless of the determination by the determining unit as to whether the usable amount of coloring agent is equal to or less than the first reference value.

4. The printer according to claim 1, further comprising
   an accepting unit configured to accept an instruction to prohibit the show-through cancellation printing operation,
   wherein when the accepting unit accepts the instruction to prohibit the show-through cancellation printing operation, the controller controls the printing unit to perform the normal printing operation regardless of determination by the determining unit as to whether the usable amount of coloring agent is equal to or less than the first reference value.

5. The printer according to claim 1, wherein the determining unit is further configured to determine, based on the detection signal from the detector, whether the usable amount of coloring agent is equal to or less than a second reference value that is lower than the first reference value, and
   wherein when the determining unit determines that the usable amount of coloring agent is equal to or less than the second reference value, the controller controls the printing unit to perform a low-density printing operation to print an image with a density lower than an original density of the original image based on the image data.

6. The printer according to claim 1, further comprising
   a reading unit configured to generate image data by performing one of single-side reading to read a single side of a document sheet and double-side reading to read both sides of a document sheet,
   wherein the controller controls the printing unit to perform the normal printing operation for image data generated in the single-side reading by the reading unit, regardless of the determination by determining unit as to whether the usable amount of coloring agent is equal to or less than the first reference value.

7. A printer comprising:
   a reading unit configured to generate image data by performing one of single-side reading to read a single side of a document sheet and double-side reading to read both sides of a document sheet;

a printing unit configured to print, on a sheet, an image based on the image data generated by the reading unit with coloring agent;

a detector configured to output a detection signal corresponding to one of a remaining amount of coloring agent and a consumed amount of coloring agent;

a determining unit configured to determine, based on the detection signal from the detector, whether a usable amount of coloring agent is equal to or less than a first reference value and whether the usable amount of coloring agent is equal to or less than a second reference value lower than the first reference value;

an accepting unit configured to accept an input to select one of a show-through cancellation mode, a switching mode, and a prohibition mode; and a controller configured to control the printing unit to perform one of a normal printing operation, a show-through cancellation printing operation, and a low-density printing operation, wherein when the image data is generated in the double-side reading and the accepting unit accepts an input to select the switching mode, the controller performs a switching process, wherein in the switching process, when determining that the usable amount of coloring agent is more than the first reference value based on the detection signal from the detector, the controller controls the printing unit to perform the normal printing operation to print an original image based on the image data, and wherein in the switching process, when determining that the usable amount of coloring agent is more than the second reference value and equal to or less than the first reference value based on the detection signal from the detector, the controller controls the printing unit to perform the show-through cancellation printing operation to print an image that is formed by removing an image recognized as a show-through image from the original image, wherein when the image data is generated in the double-side reading and the accepting unit accepts an input to select the show-through cancellation mode, the controller controls the printing unit to perform the show-through cancellation printing operation regardless of whether the usable amount of coloring agent is equal to or less than the first reference value, wherein when the image data is generated in the single-side reading or the accepting unit accepts an input to select the prohibition mode, the controller controls the printing unit to perform the normal printing operation regardless of whether the usable amount of coloring agent is equal to or less than the first reference value, and wherein when determining, based on the detection signal from the detector, that the usable amount of coloring agent is equal to or less than the second reference value, the controller controls the printing unit to perform the low-density printing operation to print an image with a first density lower than an original density of the original image based on the image data, regardless of whether the image data is generated in the single-side reading or the double-side reading or which mode is selected.

8. A non-transitory computer-readable storage medium storing computer-readable instructions for controlling a printer that comprises:

a printing unit configured to print, on a sheet, an image based on image data with coloring agent; and a detector configured to output a detection signal corresponding to one of a remaining amount of coloring agent and a consumed amount of coloring agent, wherein when executed by a processor, the instructions cause the printer to perform the steps of:

determining, based on the detection signal from the detector, whether a usable amount of coloring agent is equal to or less than a first reference value and whether the usable amount of coloring agent is equal to or less than a second reference value lower than the first reference value; and performing a switching process, and wherein the switching process comprises the steps of:

when it is determined, in the step of determining, that the usable amount of coloring agent is more than the first reference value, controlling the printing unit to perform a normal printing operation to print an original image based on the image data; and when it is determined, in the step of determining, that the usable amount of coloring agent is more than the second reference value and equal to or less than the first reference value, controlling the printing unit to perform a show-through cancellation printing operation to print an image that is formed by removing an image recognized as a show-through image from the original image, and wherein it is determined, in the step of determining, that the usable amount of coloring agent is equal to or less than the second reference value, controlling the printing unit to perform a low-density printing operation.

9. The non-transitory computer-readable storage medium according to claim 8, wherein the instructions cause the printer to further perform the steps of:

accepting an input to select one of a plurality of modes including a show-through cancellation mode and a switching mode;

when an input to select the show-through cancellation mode is accepted in the step of accepting, controlling the printing unit to perform the show-through cancellation printing operation regardless of determination in the step of determining as to whether the usable amount of coloring agent is equal to or less than the first reference value; and when an input to select the switching mode is accepted in the step of accepting, performing the switching process.

10. The non-transitory computer-readable storage medium according to claim 9, wherein the plurality of modes further include a prohibition mode to prohibit the show-through cancellation printing operation, and wherein the instructions cause the printer to further perform a step of, when an input to select the prohibition mode is accepted in the step of accepting, controlling the printing unit to perform the normal printing operation regardless of the determination in the step of determining as to whether the usable amount of coloring agent is equal to or less than the first reference value.

11. The non-transitory computer-readable storage medium according to claim 8, wherein the instructions cause the printer to further perform the steps of: accepting an instruction to prohibit the show-through cancellation printing operation;

when the instruction to prohibit the show-through cancellation mode is accepted in the step of accepting, controlling the printing unit to perform the normal printing operation regardless of determination in the step of determining as to whether the usable amount of coloring agent is equal to or less than the first reference value.

12. The non-transitory computer-readable storage medium according to claim 8, wherein the instructions cause the printer to further perform the steps of:
 judging, based on the detection signal from the detector, whether the usable amount of coloring agent is equal to or less than a second reference value that is lower than the first reference value; and
 when it is judged, in the step of judging, that the usable amount of coloring agent is equal to or less than the second reference value, controlling the printing unit to perform a low-density printing operation to print an image with a density lower than an original density of the original image based on the image data.

13. The non-transitory computer-readable storage medium according to claim 8, wherein the printer further comprises a reading unit configured to generate image data by performing one of single-side reading to read a single side of a document sheet and double-side reading to read both sides of a document sheet,
 wherein the instructions cause the printer to further perform a step of controlling the printing unit to perform the normal printing operation for image data generated in the single-side reading by the reading unit, regardless of the determination in the step of determining as to whether the usable amount of coloring agent is equal to or less than the first reference value.

14. The printer according to claim 1,
 wherein the show-through cancellation printing operation is an operation to print only an area of the image having a density equal to or less than a predetermined threshold value, with a second density lower than an original density of the original image based on the image data, and
 wherein the low-density printing operation is an operation to print a whole area of the image with a first density lower than the original density of the original image based on the image data.

15. The printer according to claim 7,
 wherein the show-through cancellation printing operation is an operation to print only an area of the image having a density equal to or less than a predetermined threshold value, with a second density lower than an original density of the original image based on the image data, and
 wherein the low-density printing operation is an operation to print a whole area of the image with the first density lower than the original density of the original image based on the image data.

16. The non-transitory computer-readable storage medium storing computer-readable instructions for controlling a printer according to claim 8,
 wherein the show-through cancellation printing operation is an operation to print only an area of the image having a density equal to or less than a predetermined threshold value, with a second density lower than an original density of the original image based on the image data, and
 wherein the low-density printing operation is an operation to print a whole area of the image with a first density lower than the original density of the original image based on the image data.

* * * * *